No. 749,683. PATENTED JAN. 12, 1904.
H. BILGRAM.
PROCESS OF SHAPING GEAR TEETH.
APPLICATION FILED APR. 18, 1903.
NO MODEL.
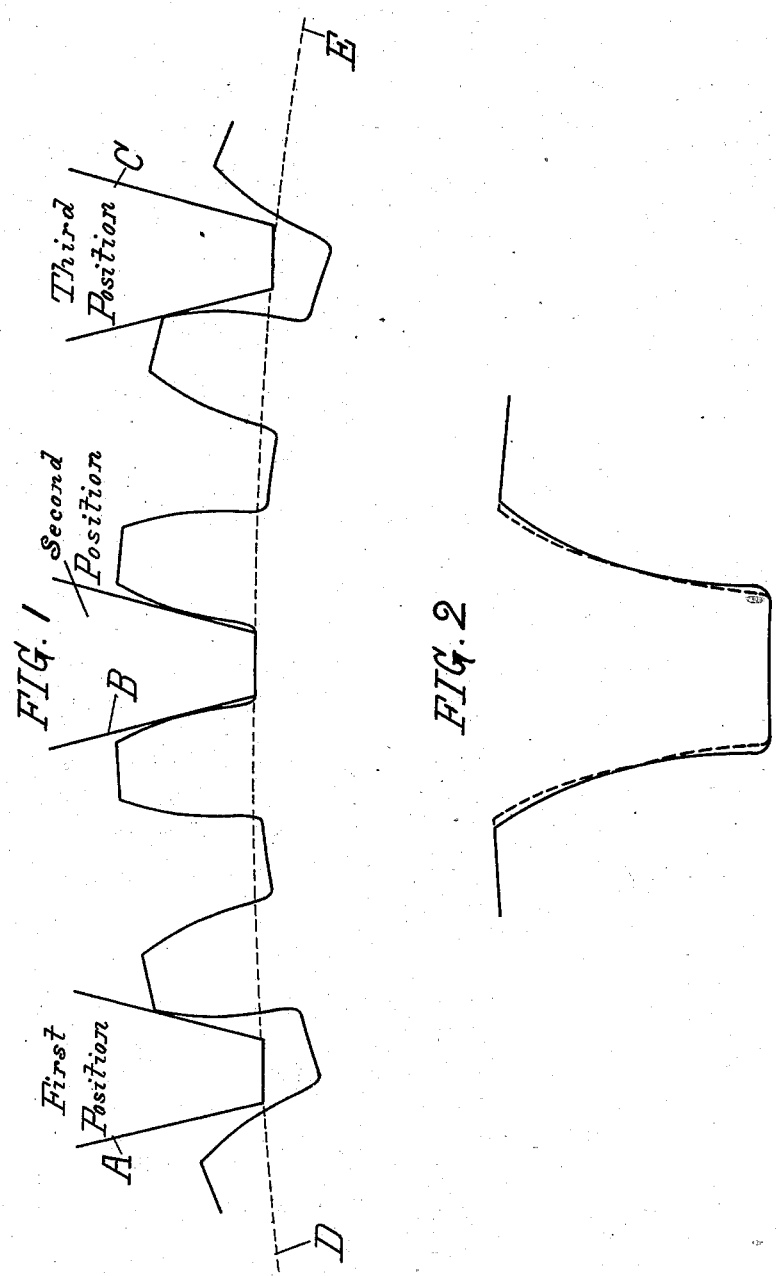

No. 749,683.

Patented January 12, 1904.

UNITED STATES PATENT OFFICE.

HUGO BILGRAM, OF PHILADELPHIA, PENNSYLVANIA.

PROCESS OF SHAPING GEAR-TEETH.

SPECIFICATION forming part of Letters Patent No. 749,683, dated January 12, 1904.

Original application filed December 19, 1902, Serial No. 135,894. Divided and this application filed April 18, 1903. Serial No. 153,222. (No model.)

*To all whom it may concern:*

Be it known that I, HUGO BILGRAM, a citizen of the United States, and a resident of the city and county of Philadelphia, State of Pennsylvania, have invented certain new and useful Improvements in Processes of Cutting Gear-Wheels, of which the following is a specification.

My invention relates to an improvement in processes for cutting the teeth of spur-gears, the object of my invention being to produce spur-gears which will run together with a minimum amount of the humming noise due to the impact of the running teeth.

It is well known that a theoretically correct tooth form in spur-gears can be obtained by means of a tool having the shape of the tooth of a rack pertaining to a change-gear system by so moving it in relation to the blank in the process of cutting as a rack engaging with the said spur-wheel when finished would move. It has been found, however, that spur-wheels so made produce a humming noise when running at high speed. This may be accounted for as follows: The teeth of wheels when properly constructed are made so that one pair of teeth make contact before the exit of the preceding pair, and for a sensible space of time two pairs of teeth remain in simultaneous contact. When the teeth are formed theoretically correct, the pressure to be transmitted will be uniformly shared between the two points of contact while two pairs are in contact and upon the exit of the receding pair will suddenly fall upon the one pair still remaining in contact. As the succeeding pair come into contact the pressure is again suddenly divided between two points of contact. This sudden change of pressure, and especially the fact that the entering tooth will be expected to instantaneously take one-half of the full pressure, readily accounts for the series of shocks manifesting themselves in the humming noises. This noise may be materially reduced if the teeth are so formed that each tooth upon coming into contact with its mate shall at first take only a small fraction of the pressure to be transmitted and that as the movement proceeds the pressure upon the approaching pair shall be gradually increased, while that of the receding pair shall be correspondingly reduced, so that the pressure shall be transferred gradually instead of suddenly from one tooth to the following one. This can be obtained by slightly relieving either at the point or near the base, or both, the surface of the otherwise correctly-formed tooth. When a pair of teeth come in contact, it is the base of the flank of the driving-tooth that comes in contact with the point of the driven tooth. It would therefore be immaterial whether the point of the face or the base of the flank of the tooth be relieved; but I think it preferable to relieve both.

In an application filed in the United States Patent Office by me on December 19, 1902, Serial No. 135,894, I have described and claimed a machine for cutting the teeth of spur-gears theoretically correctly, except that the teeth at the points and near the bases are slightly relieved, so that the teeth of meshing wheels will run together with a minimum noise.

The present application is a division of the one referred to above.

In carrying out my invention, which is a modification of the inventions described in Letters Patent of the United States No. 294,844, issued to me March 11, 1884, and No. 656,166, issued to me August 21, 1900, the former upon bevel-gear cutters, the latter upon machine for cutting teeth of geared wheels, I make use of a cutting-tool having the form of a rack-tooth, and I cause this tool to travel in relation to the blank with a slightly-curved transverse motion instead of with a straight transverse motion, as I have done heretofore, the effect of which is to cause the tool to slightly relieve or cut away the teeth at the points and near the bases.

In the accompanying drawings, forming part of this specification, Figure 1 is a diagrammatic view showing the relative movement of the cutting-tool and the wheel in the process of cutting; Fig. 2, a view, greatly exaggerated, showing a tooth-space in full and dotted lines, the latter showing the ordinary form of a space with teeth correctly cut and the former the form of the space when the points and bases of the teeth have been rounded off.

A, B, and C (shown in full lines) indicate three positions of a traversing tool which is moved relatively to the wheel to be cut with a slightly-curved instead of a straight transverse movement and which will round off the teeth at their points and near their bases, as shown in full lines, Fig. 2.

The dotted line D E, Fig. 1, shows the path of the cutting-tool.

In my application, Serial No. 135,894, above referred to one form of mechanism for causing the cutting-tool to operate as above is fully set forth; but any suitable form of mechanism for giving the cutting-tool the requisite movements can be used.

Having thus described my invention, I claim as new and desire to secure by Letters Patent—

A process of shaping gear-teeth which consists in reciprocating a tool having the form of a rack-tooth across the face of the blank, rotating the blank and simultaneously moving the tool laterally to its cutting movement along a slightly-curved path concave on the side nearest the wheel center.

HUGO BILGRAM.

Witnesses:
 ISAAC THOMPSON,
 J. R. PARKER.